June 4, 1946.   P. P. ALEXANDER   2,401,323
PRODUCTION OF METAL HYDRIDES
Filed Sept. 30, 1944
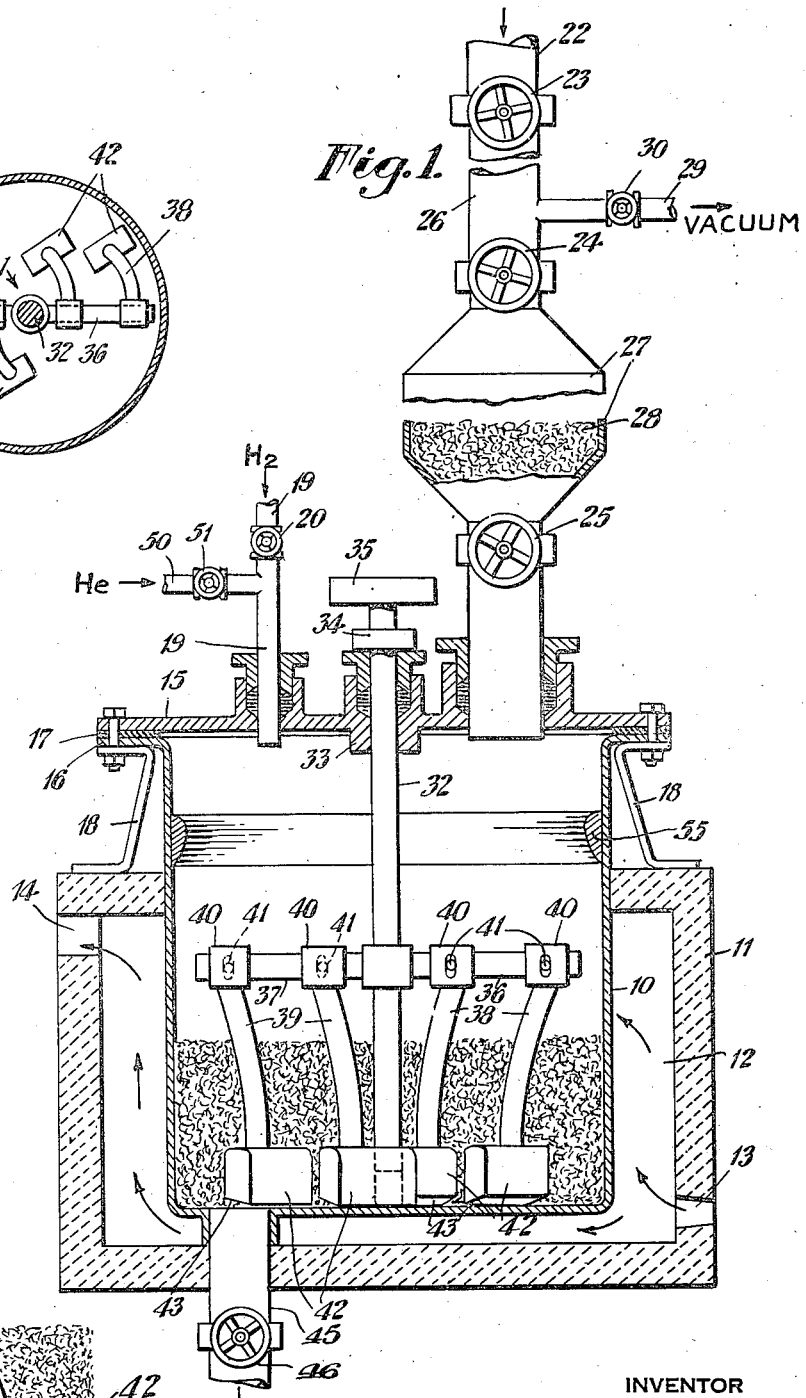
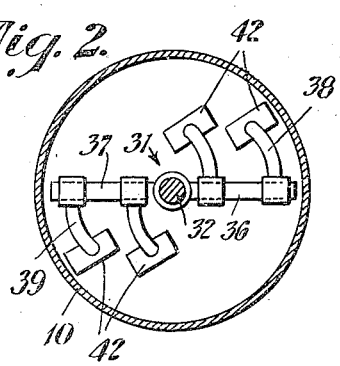
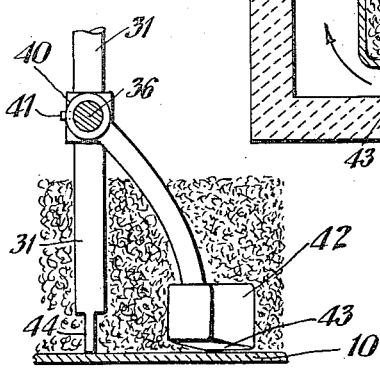
INVENTOR
PETER P. ALEXANDER
BY
Pennie, Davis, Marvin Edmonds
ATTORNEYS Patented June 4, 1946

2,401,323

UNITED STATES PATENT OFFICE 2,401,323

PRODUCTION OF METAL HYDRIDES

Peter P. Alexander, Marblehead, Mass., assignor to Metal Hydrides Incorporated, Beverly, Mass., a corporation of Massachusetts Application September 30, 1944, Serial No. 556,577

20 Claims. (Cl. 23—204)

This invention relates to metal hydrides and has for its object certain improvements in the method of producing metal hydrides.

The product of the invention is particularly useful in the production of hydrogen gas in the field, for inflating balloons and the like. Among several available methods for generating hydrogen is the action of calcium hydride on water. Since this reaction takes place at room temperature, the generation of hydrogen can be carried out simply by introducing the calcium hydride into a suitable container filled with water. This process finds little or no use, however, because of the high cost of the calcium used to produce the calcium hydride. Another method for generating hydrogen is to react ferro-silicon with caustic soda. The reaction is of a complex nature, subject to temperature variations so that the rate of generation of hydrogen varies considerably under different conditions. The caustic soda is dangerous to handle, on account of injury to body and clothing, and the process finds little favor.

Calcium hydride for the purpose of generating hydrogen gas has also been made by heating calcium oxide and magnesium in the presence of hydrogen, for example, as described in my U. S. Patent 2,082,134. If the charge of calcium oxide and magnesium is raised in temperature, a point is reached, below that at which the magnesium melts at which the magnesium begins to sublime and diffuses among the calcium oxide particles. The reduction is started by the sublimed magnesium. That is, the sublimed magnesium takes on oxygen from the calcium oxide and the reduced calcium combines with the hydrogen to form an intimate admixture of calcium hydride and magnesium oxide. A substantial amount of hydrogen appears to be adsorbed on the magnesium particles as the temperature of the charge rises, because there is a sudden release of hydrogen when the temperature of the charge approaches the melting point of magnesium, which is indicated by a large increase in hydrogen pressure. If the temperature is raised to the melting point of the magnesium too rapidly, the rise in hydrogen pressure is substantially explosive in character and therefore dangerous. Magnesium is highly reactive and must be handled with considerable care. This is particularly true when the magnesium is mechanically subdivided to produce smaller particles for use in the charge.

Since aluminum is cheaper than magnesium or calcium or ferro-silicon and is safer to handled than magnesium, it has been proposed to produce calcium hydride by reacting calcium oxide and aluminum in the presence of hydrogen gas. Magnesium has appreciable vapor pressure at the temperature of formation of the calcium hydride. Aluminum, on the contrary, does not sublime nor evaporate until heated to a temperature of about 1200° C. Calcium hydride cannot form at this temperature, since it dissociates at lower temperatures. Aluminum will not react with calcium oxide below the melting point of the aluminum; and, after it is melted, the aluminum forms isolated globules covered with a layer of aluminum oxide which prevents contact of aluminum metal with the calcium oxide.

While aluminum has been used to reduce calcium oxide, it has been done in a way that is not applicable to the production of calcium hydride. For example, pieces of calcium oxide are sunk in a bath of molten aluminum so that calcium is released to form an alloy with the aluminum. It has also been proposed to heat a charge of aluminum foil and calcium oxide under vacuum to a temperature at which the aluminum melts and then place the charge under pressure to force the molten aluminum into the evacuated pores of calcium oxide to effect reduction and volatilization of the calcium. These procedures are, obviously, not adapted for the production of calcium hydride.

In the production of metal hydrides it is important to obtain uniform action throughout the reacting charge. In the case of calcium hydride, for example, it has been proposed to use aluminum in the form of fine particles uniformly distributed throughout the charge. When such a charge is heated, the aluminum particles as just noted acquire a protective coating of refractory aluminum oxide, which prevents contact of the aluminum itself with the calcium oxide. The coating of refractory aluminum oxide prevents or greatly inhibits the chemical reaction between the aluminum and the calcium oxide. Since aluminum does not sublime, it remains enveloped in its aluminum oxide coating. If the heating of the mixture of calcium oxide and finely divided aluminum is carried out in an atmosphere of hydrogen, especially pure dry hydrogen, little or no reaction will take place. The hydrogen may prevent additional oxidation of aluminum particles, but it cannot remove the refractory coating of aluminum oxide always present on particles of aluminum.

To overcome this inherent difficulty, it has also been proposed to use molten aluminum by passing it into a retort containing the calcium oxide, the molten aluminum being introduced in the form of a spray. This does not give satisfactory results. The molten globules of aluminum may initially be entirely free from an outside coating of aluminum oxide and the reaction with calcium oxide may start, but as soon as oxygen is removed from the calcium oxide it necessarily produces a coating of aluminum oxide on the molten globules of aluminum and the further reduction of calcium oxide is greatly inhibited or stopped.

To overcome the disadvantageous effects of the refractory coating of aluminum oxide on the aluminum particles or globules of molten aluminum, it has likewise been proposed to agitate the charge by rolling or tumbling. This procedure does not give satisfactory results, since the small molten globules of aluminum encased in the adherent and continuous layer or coating of aluminum oxide are merely rolled in the mass of calcium oxide particles somewhat as drops of water in dust. The molten metallic aluminum itself does not come in contact with the calcium oxide particles to any substantial extent.

As a result of my investigations I have discovered that if the process is properly conducted, metal hydrides may be produced nevertheless by reacting a hydride-forming metal compound with aluminum in a reaction zone to reduce the metal compound, distilling the reduced metal, condensing the distilled metal in a cooler part of the reaction zone, and then admitting hydrogen gas to the reaction zone to convert the condensed metal to the desired metal hydride, the difficulties enumerated may, for the most part, be overcome. I have found that the process is especially adapted to the production of the hydrides of the alkaline-earth metals, such as calcium, strontium and barium. To achieve the desired result, I have found that it is necessary to effect the removal or rupture of the refractory coating of aluminum oxide, at least in part, from the particles or globules of aluminum; and that this may be done in several ways, so that molten unoxidized metallic aluminum is brought into reactive contact with the hydride-forming metal compound.

In accordance with one of the methods a charge of the hydride-forming metal compound, for example calcium oxide, and aluminum particles are heated in a closed retort. As the temperature of the charge is elevated, a vacuum is established in the retort to remove air and moisture. The charge is placed under sufficient vacuum as reduction proceeds to cause expansion of the molten aluminum globules within the refractory envelope of aluminum oxide and, due to the appreciable vapor pressure of the aluminum at that temperature, the unoxidized aluminum is brought into contact with the surrounding particles of calcium oxide, thus bringing the calcium oxide and unoxidized aluminum into reactive contact with one another. The reduced metal is distilled and condensed in a cooler part of the retort. Hydrogen gas is then passed into the retort to effect conversion of the reduced hydride-forming metal, calcium in this example, to its hydride.

Another method is to place a suitable flux, for example calcium fluoride, or sodium fluoride, or both, with the charge of hydride-forming metal compound and aluminum in a retort. The retort is evacuated to remove objectionable air and moisture and the charge is elevated in temperature until a point is reached at which the flux dissolves and removes the coating of aluminum oxide from the globules of molten aluminum. The metal compound is reduced, distilled and condensed in a cooler part of the retort. Hydrogen is then admitted to the retort so that conversion of the reduced hydride-forming metal to its hydride may take place. In the case of calcium oxide, the unoxidized aluminum of the globules reduces it to calcium; which is then converted by the hydrogen to calcium hydride.

In accordance with my presently preferred method, a charge of hydride-forming metal compound and particles or globules of aluminum is evacuated to remove air and moisture, preferably while the charge is rising in temperature. It is best to break the vacuum by introducing an inert gas, such as helium or argon, to place the retort under substantial positive pressure. The charge is then heated and subjected to sufficient mixing and grinding in a retort to remove or rupture the refractory coating of aluminum oxide to such an extent as to bring the unoxidized molten aluminum into reactive contact with the hydride-forming metal compound and thereby cause the desired reducing action to take place. In other words, the mixing and grinding take place during the reaction. To this end, the charge is heated to a temperature above the melting point but below the boiling point of the aluminum. The refractory coating of aluminum oxide on the resulting globules of molten aluminum is removed, at least in part, or ruptured and unoxidized molten aluminum is then brought into reactive contact with the particles of hydride-forming metal compound to effect their reduction. The reduced metal is distilled and condensed in a cooler part of the retort. Hydrogen gas is then passed into the retort to effect conversion of the reduced hydride-forming metal, calcium for example, to its hydride.

The invention will be better understood by referring to the following description, taken in conjunction with the accompanying drawing, in which:

Fig. 1 is a diagrammatic front elevation, partly in section, of an apparatus employable in the practice of the method of the invention;

Fig. 2 is a plan view on a reduced scale; and

Fig. 3 is a fragmentary side view.

The apparatus shown comprises a pot retort 10 suitably suspended within a furnace 11 having a heating chamber 12 with a conduit 13 near the bottom and a flue opening 14 near the top thereof through which to introduce heating gases and to remove spent gases from the chamber. The retort is advantageously made of heat-resistant steel. It is provided with a removable cover 15 bolted to a flange 16 extending circumferentially around the open end of the retort, a gasket 17 being located between the two. The retort is suspended in the chamber by means of a plurality of spaced supports 18 extending between the flange and the top of the furnace. A pipe 19 with a valve 20 fits into the cover for the introduction of hydrogen gas to the interior or reaction zone 21 of the retort. The cover is also provided with a charging conduit 22 to supply hydride-forming metal compound and aluminum to the interior of the retort. As shown, the conduit is fitted with three spaced valves 23, 24, and 25 to provide an evacuating passageway 26 and a trap 27 of sufficient size to receive a substantial charge 28 of the materials. A pipe 29 with a valve 30 connects the evacuating passageway with a source of vacuum, not shown.

A mechanical mixing and grinding device 31 fits within the interior of the retort. It is provided with a vertical shaft 32, the upper end of which extends through the cover and is suitably held in position by a bearing 33 and a collar 34 screwed to the shaft. The upper end of the shaft is also equipped with a pulley 35 connectible with a source of power, not shown.

The intermediate part of shaft 32 is fitted with a pair of opposed lateral arms 36 and 37 to each of which a pair of depending supports 38 and 39, respectively, is pivotally attached. The upper end of each depending support is attached to a sleeve 40 which fits loosely on the lateral arms and, therefore, permits a pivoting action. Each sleeve is provided with a slot 41 fitted with a stud bolt or other retaining means secured to the lateral arms. This arrangement permits the sleeves to pivot or rotate about the lateral arms to the extent allowed by the slots; and lateral movement of the sleeves on the lateral arms is prevented, thus maintaining the depending supports in spaced relationship to one another.

A heavy mixing and grinding block 42 is secured to the lower end of each depending support. The lower or grinding face 43 is inclined or tapered upwardly toward the direction of travel, as shown in Figs. 1 and 3, so that charge materials are worked thereunder as the blocks move in a circle across the bottom of the retort. The lower end of shaft 32 terminates in a flattened portion 44 extending almost to the bottom of the retort and is adapted to push adjacent charge materials toward and under the grinding blocks.

The shaft 32, and hence lateral arms 36 and 37, depending supports 38 and 39 and blocks 42 are rotated at a rate adapted to provide the desired mixing and grinding action. The particles of charge materials are ground and frictionally rubbed against one another to such an extent that the refractory coating of aluminum oxide is removed or ruptured, and the unoxidized molten aluminum is brought into reactive contact with the hydride-forming metal compound.

A discharge conduit 45 connects with the bottom of the retort and extends through the bottom of the furnace. A valve 46 is provided in the conduit below the furnace bottom for the removal of treated charges from the retort.

A pipe 50 connecting a source of inert gas, such as helium or argon, not shown, connects with the interior of the retort. This pipe, with a valve 51, conveniently connects with pipe 19, as shown.

In accordance with a practice of the invention, cover 15 is appropriately bolted to flange 16 to assure a sealed joint. Heating gases are passed through conduit 13 into heating chamber 12, so that the bottom of the retort is heated. Spent heating gases escape through flue opening 14. Valves 25, 24, and 30 are opened and valves 20, 23, and 46 are closed until the air, moisture and other gaseous products are evacuated from the interior of the retort. This may be accomplished by connecting conduit 29 with a vacuum pump, not shown. To hasten the evacuation step, the temperature of the interior of the retort may, for example, be raised to around 400° C. Toward the end of the evacuation period, valve 51 is opened and some inert gas is advantageously passed through pipe 19 into the retort. Helium or argon are useful for this purpose. Enough of the gas is introduced to place the interior of the retort under substantial positive pressure, for example 15 pounds.

On completion of the evacuation step, valves 25 and 30 are closed, valve 23 is opened and a loose charge of calcium oxide, for example, and aluminum 28 is passed into conduit 22 and dropped into trap 27; after which valve 23 is closed and valve 30 is opened to evacuate trap 27. Valves 24 and 30 are then closed and valve 25 is opened so that the evacuated charge is dropped into the retort. The depth of the charge is preferably kept below the level of lateral arms 36 and 37 so that charge materials and particularly molten aluminum does not enter sleeves 41.

Additional heating gases are passed into heating chamber 12 to raise the temperature of the charge within the retort to, for example, about 950° C. Mechanical mixing device 31 is rotated to mix and grind the charge intimately in the presence of the inert gas introduced through pipes 50 and 19 into the retort. As the conversion reaction takes place, exothermic heat is given off and the supply of heating gases to heating chamber 12 is discontinued. The temperature of the charge is maintained above the melting point (658° C.) but below the boiling point (1800° C.) of the aluminum as the reaction goes to completion. An inner range of 700–800° C. gives satisfactory results, and has the advantage of not being as injurious to the retort as would a temperature close to the boiling point of the aluminum. It is necessary, however, to have a temperature at which the globules of aluminum are maintained in a molten condition. While the temperature may be checked in various ways, it is practical to employ a hollow shaft 32, in which is placed a suitable thermocouple. If the temperature tends to rise above that desired, cooling air may be forced through conduit 13 into chamber 12 in amounts adapted to dissipate the extra heat. The reduced calcium is distilled and condensed more or less as a circumferential body 55 in a cooler part of the retort. Hydrogen gas is then introduced into the retort to convert the condensed calcium to the desired calcium hydride. Some or all of the inert gas may be evacuated from the retort to make place for the hydrogen. Due to the exothermic character of the hydriding reaction, it is preferable to add the hydrogen slowly while the retort is filled with the inert gas, for example as described in my copending application Serial No. 544,047, filed July 8, 1944, in order to prevent objectionable fusion of the reduced metal as well as dissociation of the newly-formed metal hydride.

The resulting calcium hydride is permitted to cool in a non-oxidizing atmosphere, such as the hydrogen, or inert gas, until it can be brought safely into contact with the atmosphere. Lid 15 is then removed and the calcium hydride is scraped from the retort wall and suitably recovered.

Among the hydride-forming metal compounds that may be treated in accordance with the invention are the oxides of the alkaline-earth metals, particularly calcium oxide, strontium oxide and barium oxide. These compounds are reduced by the aluminum and the reduced metal is converted by the hydrogen to its hydride—calcium hydride, strontium hydride and barium hydride.

It will be clear to those skilled in this art that the example given is by way of illustration and that the practice of the invention lends itself readily to other useful modifications.

I claim:

1. In the method of producing metal hydrides, the improvement which comprises heating a charge of a loose mixture of a hydride-forming metal compound and aluminum in a reaction zone to a temperature above the melting point but below the boiling point of the aluminum, the boiling point of the metal of the hydride-forming metal compound being lower than that of the aluminum, removing the refractory coating of aluminum oxide at least in part from globules of molten aluminum present in the charge, bringing unoxidized molten aluminum of the globules into reactive contact with the hydride-forming metal compound, distilling the resulting reduced metal, condensing the distilled metal in a cooler part of the reaction zone, and then admitting hydrogen gas to the reaction zone to convert the condensed metal to its hydride.

2. Method according to claim 1, in which the refractory coating of aluminum oxide on the globules of molten aluminum is removed by placing the heated charge under vacuum sufficient in amount to expand molten aluminum within the refractory coating so that unoxidized molten aluminum within the globules is brought into reactive contact with the hydride-forming metal compound.

3. Method according to claim 1, in which the refractory coating of aluminum oxide on the globules of molten aluminum is removed by heating the charge in the presence of a flux that dissolves the aluminum oxide coating.

4. Method according to claim 1, in which the refractory coating of aluminum oxide on the globules of molten aluminum is removed by mixing and grinding the charge during the resulting reaction in amount sufficient to break up the aluminum oxide coating so that unoxidized molten aluminum within the globules is brought into reactive contact with the hydride-forming metal compound.

5. Method according to claim 1, in which the reaction zone and charge are initially heated and evacuated to remove air and moisture, and inert gas is admitted into the reaction zone in amount sufficient to place it under substantial positive pressure.

6. In the method of producing metal hydrides, the improvement which comprises heating a charge of an alkaline-earth metal oxide and aluminum in a reaction zone to a temperature above the melting point but below the boiling point of the aluminum, removing the refractory coating of aluminum oxide at least in part from globules of molten aluminum present in the charge, bringing unoxidized molten aluminum of the globules into reactive contact with the alkaline-earth metal compound, distilling the resulting reduced alkaline-earth metal, condensing the distilled metal in a cooler part of the reaction zone, and then admitting hydrogen gas to the reaction zone to convert the condensed metal to its alkaline-earth metal hydride.

7. Method according to claim 6, in which the refractory coating of aluminum oxide on the globules of molten aluminum is removed by placing the heated charge under vacuum sufficient in amount to expand molten aluminum within the refractory coating so that unoxidized molten aluminum within the globules is brought into reactive contact with the alkaline-earth metal compound.

8. Method according to claim 6, in which the refractory coating of aluminum oxide on the globules of molten aluminum is removed by heating the charge in the presence of a flux that dissolves the aluminum oxide coating.

9. Method according to claim 6, in which the refractory coating of aluminum oxide on the globules of molten aluminum is removed by mixing and grinding the charge during the resulting reaction in amount sufficient to break up the aluminum oxide coating so that unoxidized molten aluminum within the globules is brought into reactive contact with the alkaline-earth metal compound.

10. Method according to claim 6, in which the reaction zone and charge are initially heated and evacuated to remove air and moisture, and inert gas is admitted into the reaction zone in amount sufficient to place it under substantial positive pressure.

11. In the method of producing metal hydrides, the improvement which comprises heating a charge of a loose mixture of an alkaline-earth metal oxide and aluminum in a reaction zone to a temperature above the melting point but below the boiling point of the aluminum, removing the refractory coating of aluminum oxide at least in part from globules of molten aluminum present in the charge, bringing unoxidized molten aluminum of the globules into reactive contact with the alkaline-earth metal oxide, distilling the resulting reduced alkaline-earth metal, condensing the distilled metal in a cooler part of the reaction zone, and then admitting hydrogen gas to the reaction zone to convert the condensed metal to its alkaline-earth metal hydride.

12. Method according to claim 11, in which the refractory coating of aluminum oxide on the gobules of molten aluminum is removed by placing the heated charge under vacuum sufficient in amount to expand molten aluminum within the refractory coating so that unoxidized molten aluminum within the globules is brought into reactive contact with the alkaline-earth metal compound.

13. Method according to claim 11, in which the refractory coating of aluminum oxide on the globules of molten aluminum is removed by heating the charge in the presence of a flux that dissolves the aluminum oxide coating.

14. Method according to claim 11, in which the refractory coating of aluminum oxide on the globules of molten aluminum is removed by mixing and grinding the charge during the resulting reaction in amount sufficient to break up the aluminum oxide coating so that unoxidized molten aluminum within the globules is brought into reactive contact with the alkaline-earth metal oxide.

15. Method according to claim 11, in which the reaction zone and charge are initially heated and evacuated to remove air and moisture, and inert gas is admitting into the reaction zone in amount sufficient to place it under substantial positive pressure.

16. In the method of producing metal hydrides, the improvement which comprises heating a charge of a loose mixture of calcium oxide and aluminum in a reaction zone to a temperature above the melting point but below the boiling point of the aluminum, removing the refractory coating of aluminum oxide at least in part from the globules of molten aluminum present in the charge, bringing unoxidized molten aluminum of the globules into reactive contact with the calcium oxide, distilling the resulting reduced calcium, condensing the distilled calcium in a cooler part of the reaction zone, and then admitting hydrogen gas to the reaction zone to convert the condensed calcium to calcium hydride.

17. Method according to claim 16, in which the refractory coating of aluminum oxide on the globules of molten aluminum is removed by placing the heated charge under vacuum sufficient in amount to expand molten aluminum within the refractory coating so that unoxidized molten aluminum within the globules is brought into reactive contact with the calcium oxide.

18. Method according to claim 16, in which the refractory coating of aluminum oxide on the globules of molten aluminum is removed by heating the charge in the presence of a flux that dissolves the aluminum oxide coating.

19. Method according to claim 16, in which the refractory coating of aluminum oxide on the globules of molten aluminum is removed by mixing and grinding the charge during the resulting reaction in amount sufficient to break up the aluminum oxide coating so that unoxidized molten aluminum within the globules is brought into reactive contact with the calcium oxide.

20. Method according to claim 16, in which the reaction zone and charge are initially heated and evacuated to remove air and moisture, and inert gas is admitted into the reaction zone in amount sufficient to place it under substantial positive pressure.

PETER P. ALEXANDER.